(12) United States Patent
Kuwayama

(10) Patent No.: US 6,450,487 B1
(45) Date of Patent: Sep. 17, 2002

(54) CYLINDRICAL DYNAMIC DAMPER EXHIBITING HIGH BONDING STRENGTH BETWEEN MASS MEMBER AND ELASTIC SUPPORT MEMBERS

(75) Inventor: Naohito Kuwayama, Nagoya (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/774,813

(22) Filed: Jan. 31, 2001

(30) Foreign Application Priority Data

Sep. 20, 2000 (JP) ........................................ 2000-285750

(51) Int. Cl.$^7$ ................................................ F16F 7/00
(52) U.S. Cl. ..................... 267/141; 267/141.2; 188/379
(58) Field of Search ............................. 267/141, 141.2, 267/141.3, 141.4, 141.5, 153, 293; 188/379

(56) References Cited

U.S. PATENT DOCUMENTS

| | | | | |
|---|---|---|---|---|
| 3,893,775 A | * | 7/1975 | Sievers et al. | 267/281 |
| 5,056,763 A | * | 10/1991 | Hamada et al. | 267/141 |
| 5,090,668 A | * | 2/1992 | Hamada | 267/141 |
| 5,593,144 A | | 1/1997 | Hamada et al. | 267/141 |
| 6,098,436 A | * | 8/2000 | Girardello et al. | 72/42 |

FOREIGN PATENT DOCUMENTS

| | | | |
|---|---|---|---|
| JP | 2-190641 | | 7/1990 |
| JP | 6-37915 | | 5/1994 |
| JP | 8-28627 | | 2/1996 |
| JP | 8-247213 A | * | 9/1996 |

* cited by examiner

*Primary Examiner*—Jack Lavinder
*Assistant Examiner*—Mariano Sy
(74) *Attorney, Agent, or Firm*—Rossi & Associates

(57) ABSTRACT

A dynamic damper mounted on a rod-shaped oscillating member includes: a cylindrical metallic mass member formed of sintered metal or forging and adapted to be disposed radially outwardly of the oscillating member; two elastic support members formed on axially opposite sides of the metallic mass member to elastically support the metallic mass member; and an elastic covering layer integrally formed with the elastic support member and fixed in close contact with substantially the entire area of the surface of the metallic mass member. The metallic mass member has at least two slits extending through a wall thickness thereof, which are open in and extending axially inwardly from axially opposite end faces of the metallic mass member, respectively, and are filled with the elastic covering layer. The metallic mass further has inclined planes formed at radially inner edges of circumferentially opposite open-end edge portions of each slit. The inclined plane extends over an inner surface of the corresponding slit, the corresponding axial end face of the metallic mass member and the inner circumferential surface of the metallic mass member, to chamfer the radially inner edge of the corresponding open-end edge portion.

12 Claims, 5 Drawing Sheets

CYLINDRICAL DYNAMIC DAMPER EXHIBITING HIGH BONDING STRENGTH BETWEEN MASS MEMBER AND ELASTIC SUPPORT MEMBERS

This application is based on Japanese Patent Application No. 2000-285750 filed Sep. 20, 2000, the contents of which are hereby incorporated by reference.

BACKGROUND OF THE INVENTION

1. Field of the Invention

The present invention relates to a dynamic damper having a generally cylindrical shape, which is installed on a hollow or a solid rod member used as a vibration transmitting member such as shafts, arms and conduits in various devices and being subject to oscillation or vibration, so that vibration of the rod member is reduced or absorbed.

2. Discussion of the Related Art

There are known various kinds of rod members such as shafts or arms functioning as power transmitting members and such as conduits or pipes serving as a fluid passage. Such a rod member generally tends to oscillate or vibrate and consequently suffers from problems of resonance thereof and undesirable transmission of the excited vibration therein to the other components of a device in which the rod member is used. As a method to cope with these problems, a dynamic damper is attached to the rod member. Examples of such a dynamic damper are disclosed in JPA-2-190641, JP-B-6-37915 and JP-A-8-28627, wherein the dynamic damper has a metallic mass member having a generally cylindrical configuration and a pair of elastic support members formed on axially opposite sides of the mass member so as to extend axially outward directions, respectively. The disclosed dynamic damper is inserted onto the rod member and secured thereto at the elastic support members so that the mass member is elastically supported on the oscillating rod member via the elastic support members. Such a generally cylindrical dynamic damper is properly tuned so that the dynamic damper is capable of exhibiting effective damping characteristics with respect to a torsional or a circumferential vibration as well as a radial vibration of the rod member. Further, the mass member of the dynamic damper is less likely to drop off or released from the rod member owing to its cylindrical shape, even if the elastic support member is undesirably broken. For these advantages, the dynamic damper has been used as a dynamic damper for a drive shaft of an automotive vehicle.

In the conventional dynamic damper, the mass member is generally formed of a carbon steel by casting, or alternatively is formed by roll molding performed on a metal plate, since these materials are available at a relatively low cost and has a relatively large mass. The elastic support members are bonded to the mass member in the process of vulcanization of a rubber material for forming the elastic support member.

The conventional dynamic damper constructed as described above requires an adhesion treatment, e.g., an application of the adhesive on the circumferential surface of the mass member, upon bonding the elastic support member to respective portions of the mass member in the above-indicated vulcanization of the material. This may cause deterioration in terms of efficiency and cost of manufacture of the dynamic damper.

In the light of these drawbacks of the conventional dynamic damper, it is considered to modify the conventional dynamic damper to comprise an elastic covering layer which is integrally formed with the elastic support members so as to cover substantially entire area of the outer surface of the mass member, so that the mass member is fixed to the elastic support member without using the adhesion applied between the elastic support member and the mass member. However, the omission of the adhesive treatment leads to difficulty in attaining practically sufficient fixing or bonding strength between the elastic support members and the mass member. Described in detail, the elastic support members and the mass member which are not bonded with each other via the adhesive layer, are likely to be displaced relative to each other at the interface therebetween upon application of a relatively large vibrational load to the dynamic damper. This may possibly cause deterioration of vibration damping effect of the dynamic damper.

SUMMARY OF THE INVENTION

It is therefore an object of the present invention to provide a dynamic damper which is novel in construction and which permits a high fixing or bonding strength between a metallic mass member and an elastic support member with no adhesive treatment performed on the metallic mass member.

The above object may be attained according to the following modes of the invention, each of which is numbered like the appended claims and depends from the other mode or modes, where appropriate, to indicate possible combinations of elements or technical features of the invention. It is to be understood that the present invention is not limited to those modes of the invention and combinations of the technical features, but may otherwise be recognized based on the teachings of the present invention disclosed in the entire specification and drawings or that may be recognized by those skilled in the art in the light of the present disclosure in its entirety.

(1) A dynamic damper mounted on a rod-shaped oscillating member, including: (a) a generally cylindrical metallic mass member formed of sintered metal or forging, and disposed radially outwardly of the oscillating member; (b) a pair of elastic support members formed on and extending axially outwardly from axially opposite sides of the metallic mass member to elastically support the metallic mass member with respect to the rod-shaped oscillating member; and (c) an elastic covering layer integrally formed with the pair of elastic support members and being fixed in close contact with a substantially entire area of a surface of the metallic mass member without using an adhesive, for covering the substantially entire area of the surface of the metallic mass member, the metallic mass member having at least two slits extending through a wall thickness thereof, the at least two slits being open in and extending axially inwardly from axially opposite end faces of the metallic mass member, respectively, and being filled with the elastic covering layer, the metallic mass member further having inclined planes formed at radially inner edges of circumferentially opposite open-end edge portions of each of the at least two slits, each of the inclined planes extending over an inner surface of the corresponding slit, the corresponding axial end face of the metallic mass member and the inner circumferential surface of the metallic mass member, to chamfer the radially inner edge of the corresponding open-end edge portion.

In the dynamic damper constructed according to the above mode (1) of the present invention, the metallic mass member is formed of sintered metal or forging. This arrangement permits a relatively high level of surface roughness of the metallic mass member of the dynamic damper of the present invention in comparison with a metallic mass member formed by casting or pressing. Accordingly, the elastic covering layer fixed in close contact with the rugged surface of the metallic mass member is firmly secured to the metallic mass member owing to a mechanical fixing force caused by engagement of the rugged surface of the metallic mass member with the inner surface of the elastic covering layer which is rugged corresponding to the rugged surface of the metallic mass member upon vulcanization of a rubber material to form the elastic covering layer, resulting in elimination of the adhesive treatment. Various kinds of known sintered metallic materials, including pure iron type, iron-carbon type, and iron-copper type, may be employed for the metallic mass member of the dynamic damper of the present invention, taking into account the required mass of the metallic mass member, the manufacturing cost, working conditions of the dynamic damper and the like. Further, various kinds of known forging or forged members, such as a carbon steel may be used as the metallic mass member, and the metallic mass member may be formed by hot forging or alternatively by cold forging. The employed forging should be subjected to a scale removal treatment by a shot blasting method or the like. In addition, the metallic mass member may be provided with tapered inner and outer circumferential surfaces, as needed, thereby facilitating release of the metallic mass member from the mold.

In the dynamic damper constructed according to the present invention, the metallic mass member has at least two slits formed at axially opposite side portions thereof, respectively. That is, each of the axially opposite side portions of the metallic mass member has at least one slit formed therethrough and open in the corresponding one of the axially opposite end face of the mass member. These slits formed through the metallic mass member are filled with the elastic covering layer. The parts of the elastic covering layer which fill the slits, function to directly connect the radially inner part of the elastic covering layer formed on the inner circumferential surface of the metallic mass member and the radially outer part of the elastic covering layer formed on the outer circumferential surface of the metallic mass member. This arrangement permits further improved fixing stability of the elastic covering layer to the metallic mass member, without requiring the use of the adhesive interposed between the elastic covering layer and the metallic mass member.

Namely, the dynamic damper constructed according to the present invention permits a sufficiently enhanced fixing stability between the elastic covering layer and the metallic mass member, while assuring elimination of the adhesive treatment and a resultant reduced manufacturing cost, owing to the surface characteristics of the metallic mass member formed of sintered metal prepared by heating the compressed metallic power, or formed of forging subjected to the scale removable treatment. It should be appreciated that the process for removing the scale of the forging is generally performed upon manufacturing the forging. Therefore, the present invention requires no specific facilities or manufacturing process for performing the scale removal treatment on the metallic mass member, and accordingly no increase in the manufacturing cost.

In the presence of the inclined planes formed at the radially inner edges of the circumferentially opposite open-end edge portions of the slits of the metallic mass member, the dynamic damper according to this mode of the invention is less likely to suffer from or free from a possible problem of the deterioration in stability of the elastic support members due to the presence of the slits in the metallic mass member. Described in detail, a dynamic damper including a cylindrical metallic mass member and the two elastic support members which are formed axially opposite sides of the metallic mass member for elastically supporting the metallic mass member, is likely to suffer from a stress concentration generated at or near a boundary between elastic support members and the axially opposite end faces of the metallic mass member. If the slits are formed in the metallic mass member so as to open in the respective axially opposite end faces of the metallic mass member, the edge portions are formed at circumferentially opposite sides of the open end portion of each slit. That is, the circumferentially opposite open-end edge portions of each slit are provided in the axially opposite end faces of the metallic mass member. These edge portions of the metallic mass member may possibly cause further stress concentration generated at or near a boundary between the elastic support members and the edge portions of the metallic mass member, resulting in insufficient durability of the elastic support member. To cope with this problem, the dynamic damper according to this mode of the invention is arranged such that the radially inner edge of each of the open-end edge portions of the metallic mass member is chamfered to provide the inclined plane. The arrangement is effective to ease the stress concentration generated at or near the boundary between the elastic support member and the edge portions and to prevent occurrence of defects such as cracking in the elastic support members. Thus, the dynamic damper according to this mode of the invention can exhibit a desired durability of the elastic support members.

In this respect, inclined planes are formed only at the radial inner edges of the open-end edge portions of the metallic mass member and are arranged to extend not to reach the outer circumferential surface of the metallic mass member. This arrangement is effective not only to prevent a change of the spring characteristics of the elastic support member due to the formation of the inclined planes, but also to restrain decrease of the mass of the metallic mass member, resulting in elimination of adverse effect of the formation of the inclined planes on the vibration damping characteristics of the dynamic damper.

Various kinds of rubber materials may be employed for forming the elastic support member and the elastic covering layer which are integrally formed with each other, depending upon required vibration damping characteristics of the dynamic damper of the present mode of the invention. For instance, a rubber material such as NR (natural rubber), SBR (styrene-butadiene rubber) or BR (butadiene rubber), or a mixture of any two or more thereof may be suitably used. The elastic covering layer is only required to cover substantially the entire area of the surface of the cylindrical metallic mass member, and does not necessarily require to cover local portions of the metallic mass member to which supporting members of the mold are butted, for supporting and positioning the metallic mass member in the mold. The thickness of the elastic covering layer is determined to be held preferably within a range of 0.5–5 mm, more preferably within a range of 1–3 mm, in view of the fact that the elastic covering layer having an excessively small thickness may deteriorate its durability or its fixing strength to the cylindrical metallic mass member, while an excessively large thickness of the elastic covering layer may lead to an undesirable increase in the size of the dynamic damper.

In order to form and closely secure the elastic covering layer on and to the outer circumferential surface of the metallic mass member, it is desirable to integrally form the elastic covering layer and the elastic support members by vulcanizing a rubber material to form the elastic covering layer and the elastic support member in a mold wherein the metallic mass member is placed in position. In this respect, the metallic mass member does not need to be subjected to the adhesive treatment, but may be subjected to washing or degreasing treatments, as needed.

(2) A dynamic damper according to claim 1, wherein each of the slits has an axial length of one-fourth to three-fourths of an axial length of the metallic mass member.

If each slit has its axial length smaller than one-fourth of the axial length of the cylindrical metallic mass member, the corresponding part of the elastic covering layer which fills the slit may possibly function insufficiently to connect the radially inner and outer parts of the elastic covering layer with each other. If the slit has its axial length larger than three-fourths of the axial length of the cylindrical metallic mass member, on the other hand, it makes it difficult to obtain sufficient mass of the metallic mass member. In this mode (2), the axial length of each slit is limited within the range of one-fourth to three-fourths of the axial length of the metallic mass member, thereby assuring a sufficient mass of the metallic mass member, while ensuring sufficient fixing strength between the metallic mass member and the elastic covering layer. In order to attain the sufficient mass of the metallic mass member and the sufficient fixing strength between the metallic mass member and the elastic covering layer, in a relatively higher level, the axial length of each slit is preferably limited within a range of one-third to two-thirds, more preferably limited within a range of one-third to a half of the axial length of the metallic mass member.

The circumferential positions of the slits in the metallic mass member are not particularly limited. For instance, the circumferential positions of the slits formed on one side of the metallic mass member may coincide with, or alternatively differ from those of the slits formed on the other side of the metallic mass member. In the former case, the axial length of the slits needs to be smaller than about a half of the axial length of the metallic mass member. In the latter case, the slits can have the axial length of not smaller than about a half of the axial length of the metallic mass member, within the above-indicated upper limit.

(3) A dynamic damper according to the above-indicated mode (1) or (2), wherein each of the inclined planes has a size which is determined such that the corresponding radially inner edge is chamfered by 1.0 mm or more at respective three lines of intersections of adjacent ones of the inner surface of the corresponding slit, the corresponding axial end face of the metallic mass member and the inner circumferential surface of the metallic mass member.

If the inclined plane is excessively small in size, the inclined plane is less likely to function to reduce or ease the level of the stress concentration in the boundary between the elastic support member and the circumferentially opposite open-end edge portions of each of the slit of the metallic mass member. On the other hand, if the inclined plane is excessively large in size, it becomes difficult to obtain a required mass of the metallic mass member sufficiently. In this mode (3), the radially inner edge of each of the open-end edge portions is chamfered by 1.0 mm or more at respective three lines of intersections of the adjacent ones of the above-indicated three surfaces, namely including a first line of intersection of the inner surface of the slit and the axial end face of the metallic mass member, a second line of intersection of the inner surface of the slit and the inner circumferential surface of the metallic mass member, and a third line of intersection of the axial end face of the metallic mass member and the inner circumferential surface of the metallic mass member. This makes it possible to exhibit improved durability of the elastic support member, owing to the stress-concentration-easing effect of the resultant inclined plane, while assuring a sufficiently large mass of the metallic mass member. Preferably, each of the inclined planes has a size which is determined such that the corresponding radial inner edge is chamfered by 2.0 mm or more at respective three lines of intersections of adjacent ones of the inner surface of the corresponding slit, the corresponding axial end face of the metallic mass member and the inner circumferential surface of the metallic mass member. In this respect, the upper limit of the size of the inclined plane is determined such that the inclined plane extends at the lines of intersection of the inner surface of the slit and the axial end face of the metallic mass member with a length which is smaller than the dimension of the wall thickness of the metallic mass member.

(4) A dynamic damper according to any one of the above-indicated modes (1)–(3), wherein the surface of the metallic mass member has a ten-point mean roughness Rz within a range from 30 $\mu$m to 200 $\mu$m.

Namely, an excessively small Rz value of the surface roughness of the metallic mass member leads to difficulty in obtaining a sufficient fixing stability between the metallic mass member and the elastic covering layer, while an excessively larger Rz value of the surface roughness of the metallic mass member may lead to deterioration of efficiency and increased cost of manufacture. In the above mode (4), the metallic mass member is arranged to have a ten-point mean roughness Rz within a range from 30 $\mu$m to 200 $\mu$m, thereby effectively providing a metallic mass member which assures sufficient bonding stability between the metallic mass member and the elastic support members. Preferably, the metallic mass member is arranged to have a ten-point mean roughness Rz within a range from 50 $\mu$m to 100 $\mu$m, resulting in further improved efficiency in obtaining the desired bonding stability between the metallic mass member and the elastic covering layer.

(5) A dynamic damper according to any one of the above-indicated modes (1)–(4), wherein the pair of elastic support members have a tapered cylindrical shape such that the elastic support members extending axially outwards and radially inwards from the axially end faces of the metallic mass member.

In the dynamic damper according to the above mode (5), the use of the tapered elastic support members facilitates tuning of the spring characteristics of the dynamic damper in various directions including an axial direction, a radial direction, a bending direction and a torsional direction, by adjusting a taper angle or a wall thickness of the elastic support members. Further, the taper angle or the axial length of the elastic support members may be suitably adjusted depending upon the outside diameter of the rod member on which the dynamic damper is installed. This makes it possible to use the same metallic mass member for different oscillating rod members which have different outside diameters.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
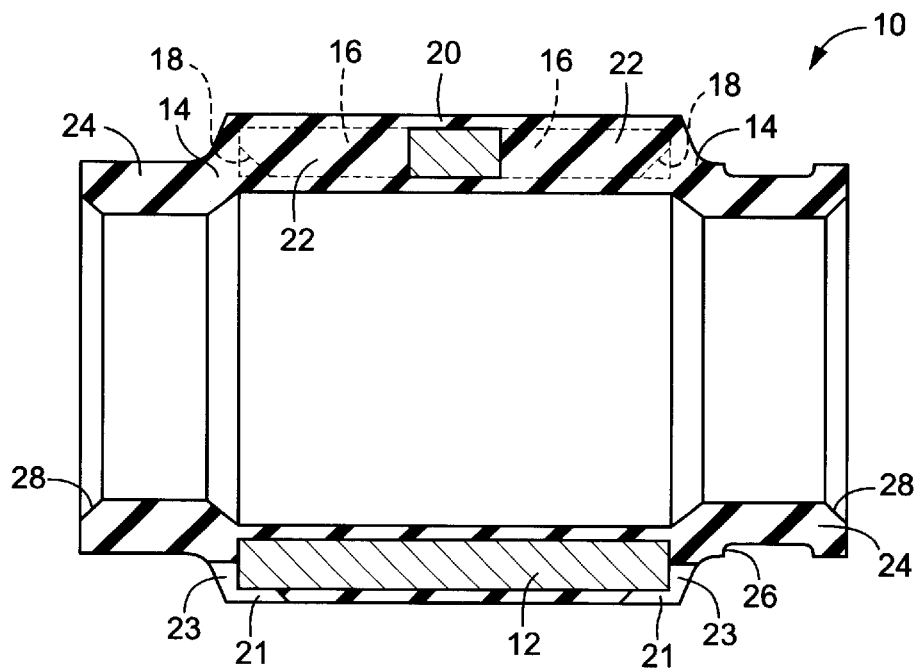
FIG. 1 is an elevational view in longitudinal or axial cross section of a dynamic damper according to one embodiment of the inventions taken along line 1—1 of FIG. 2.
Figure 2:
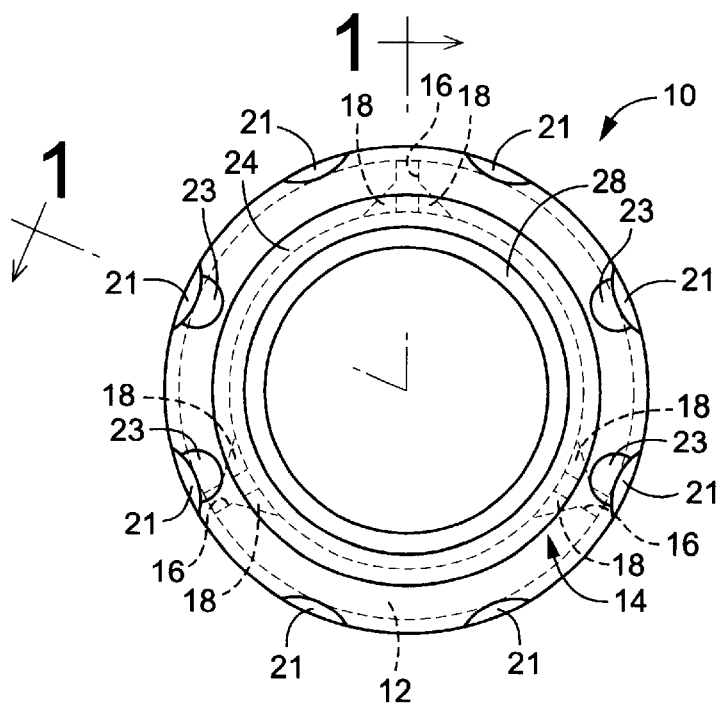
FIG. 2 is a right side elevational view of the dynamic damper of FIG. 1.
Figure 3:
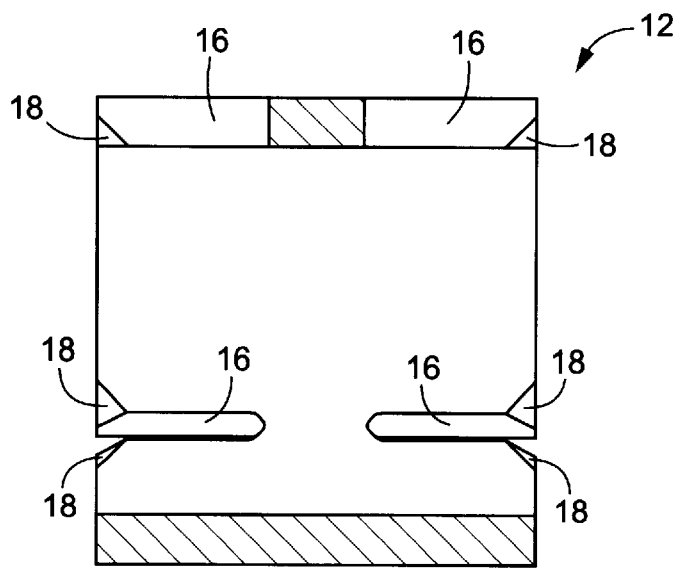
FIG. 3 is an elevational view in axial cross section of a metallic mass member of the dynamic damper of FIG. 1, taken along line 3—3 of FIG. 4.
Figure 4:
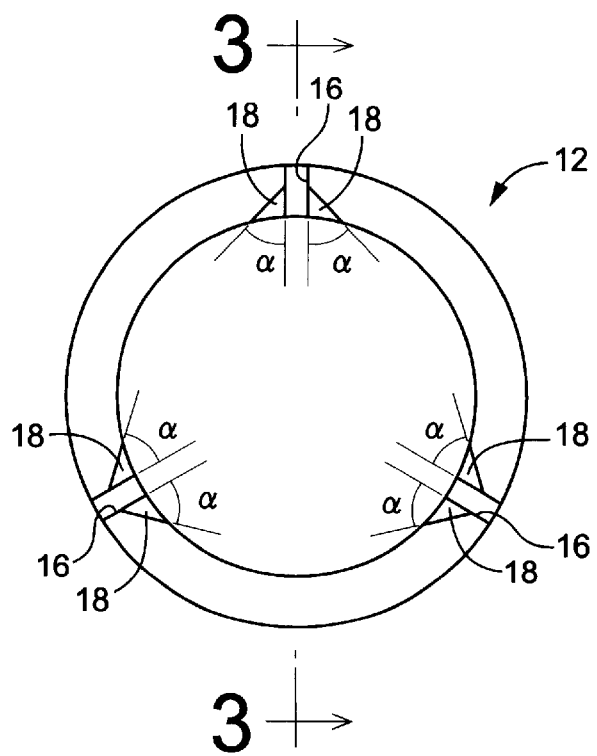
FIG. 4 is a right side elevational view of the metallic mass member of FIG. 3.

Referring first to FIGS. 1 and 2, there is shown a dynamic damper 10 constructed according to one preferred embodiment of the present invention. The dynamic damper 10 has a generally cylindrical shape and includes a generally cylindrical metallic mass 12 and a pair of elastic support members 14 formed on and secured to the axially opposite sides of the metallic mass 12 so as to extend axially outwardly from the axially opposite sides of the metallic mass 12. The dynamic damper 10 is inserted onto a vehicle drive shaft as an oscillating rod member and secured thereto at the elastic support members 14, so that the dynamic damper 10 exhibits a desired vibration damping effect with respect to vibrations in a radial direction perpendicular to an axial direction of the drive shaft and in a torsional or circumferential direction of the drive shaft.

Described more specifically, the metallic mass 12 is a thick-walled cylindrical member formed of sintered metal, in the present embodiment. Namely, the metallic mass 12 may be formed as follows: First, powder or particles of a suitable metallic material are mixed with a lubricant such as zinc stearate, and pressed into a mold to form the desirably shaped metallic mass 12, and then sintered or heated in an atmosphere of suitable gas, to a temperature below the melting point of the alloy where solid-state bonding of the particles takes place. The obtained metallic mass 12 is then subjected to mechanical treatments, quenching and tempering treatments, or other treatments as needed, thereby being provided as a product.

In the thus formed metallic mass 12, the entire surface of the metallic mass 12 is effectively roughed due to the metallic particles located in the surface of the metallic mass 12, which particles are bonded with each other in solid-state by sintering. Preferably, the metallic mass 12 has a surface roughness ranging from 30 μm to 200 μm, more preferably ranging from 50 μm to 100 μn as measured ten-point means roughness Rz scale.

The metallic mass 12 is formed at its both opposite axial end portions with a plurality of slits 16 each extending through its wall-thickness while extending straightly in its axial direction from the corresponding axial end face thereof toward the axially inner portion thereof with a constant width. That is, each slit 16 is open in the corresponding axial end face of the metallic mass 12. Preferably, each of the plurality of slits 16 has a width ranging from 1.0 mm to 4.0 mm, more preferably ranging from 2.0 mm to 3.0 mm.

In the present embodiment, three slits 16 are formed in each of the axially opposite end portions of the metallic mass 12, such that the three slits 16 are equally spaced apart from each other in the circumferential direction of the metallic mass 12. Further three slits 16 formed in the one opposite axial end portion of the metallic mass 12 are axially opposed to the three slits 16 formed in the other axial end portion, respectively. That is, the circumferential positions of the slits 16 formed in one side of the metallic mass 12 are identical with those of the slits 16 formed in the other side of the metallic mass 12. Each slit 16 is dimensioned so as to have an axial length of about two-fifths of the axial length of the metallic mass 12. This arrangement is effective to prevent the metallic mass 12 being entirely divided in its circumferential direction, even in the case where the circumferential positions of the slits 16 formed in one side of the metallic mass 12 are identical with those of the slits 16 in the other side.

In the presence of the slits 16, each of the axially opposite end portions of the metallic mass 12 has open-end edge portions of each of the slits 16, which are opposed to each other in the circumferential direction of the metallic mass 12 with the opening of the slit 16 interposed therebetween. These open-end edge portions located on the circumferentially opposite sides of each slit 16, are arranged to have inclined planes 18 at their radially inner edges, by chamfering the radially inner edges such that the resultant inclined planes 18 extend over the inner surface of the slit 16, the corresponding axial end face of the metallic mass 12 and the inner circumferential surface of the metallic mass 12. The size of each inclined plane 18 may be determined such that the radial inner edge of the corresponding open-end edge portion is chamfered by 1.0 mm or more, more preferably by 2.0 mm or more at respective three lines of intersections of adjacent ones of the inner surface of the corresponding slit, the corresponding end face of the metallic mass 12 and the inner circumferential surface of the metallic mass 12. In the present embodiment, particularly, the inclined plane 18 is arranged to have a generally equilateral triangle shape in which three sides have the same length the value of which is equal to about a half of the wall thickness of the metallic mass 12, and is arranged such that an angle a between the line of intersection of the inclined plane 18 and the axial end face of metallic mass 12, and the intersection of the inner surface of the slit 16 and the axial end face of the metallic mass 12, has an angular value preferably of 30–60 degrees, more preferably of 40–50 degrees. It is noted that the amount of chamfering of the radial inner edge of the each open-end edge portions of the slits 16 is made smaller than the wall thickness of the metallic mass 12 as measured at the line of intersection of the inner surface of the slit 16 and the axial end face of the metallic mass 12, so that the inclined plane 18 is regulated not to extend to the outer circumferential surface of the metallic mass 12.

A rubber layer 20 as an elastic covering layer is fixed in close contact with the surface of the metallic mass 12. The rubber layer 20 is a thin rubber layer which extends over the entire area of the surface of the metallic mass 12 with a substantially constant thickness. Preferably, the rubber layer 20 has a thickness of 0.5 mm–5.0 mm, more preferably of 1.0 mm–3.0 mm. The rubber layer 20 further extends into the inside area of the slits 16, thereby providing filling rubber portions 22 as an integral part of the rubber layer 20 which fill the slits 16, respectively. In the presence of the filling rubber portions 22, the radially outer part of the rubber layer 20 located on the outer circumferential surface of the metallic mass 12 and the radially inner part of the rubber layer 20 located on the inner circumferential surface of the metallic mass 12 are connected with each other via the filling rubber portions 22 of the rubber layer 20.

The pair of the elastic support members 14 are formed so as to extend over a suitable axial length from the respective axially opposite ends of the metallic mass 12. Each of the elastic support members 14 has a generally hollow cylindrical shape extending axially outwardly and radially inwardly from the corresponding axial end face of the metallic mass 12, and includes a cylindrical fixing portion 24 integrally formed with its axially protruding end portion (a small diameter end portion), which extends axially outwardly from the axially protruding end portion with a substantially constant inner and outer diameters. One of the two cylindrical fixing portions 24 has an annular groove 26 formed in its outer circumferential surface so as to extend in its circumferential direction. The annular groove 26 is adapted to receive a retainer band. Each cylindrical fixing portion 24 has a circumferential tapered surface 28 at the axial outer end portion of its inner circumferential surface. The tapered surface 28 extends axially outwardly and radially outwardly toward the axial end face thereof. These tapered surfaces 28 facilitate a process of inserting the dynamic damper 10 onto the drive shaft of the vehicle.

The dynamic damper 10 constructed as described above is installed on the drive shaft (not shown) of the vehicle such that the dynamic damper 10 is disposed radially outwardly of the drive shaft. In the dynamic damper 10 of the present embodiment, the inside diameter of the fixing portions 24 is made slightly smaller than the outside diameter of the drive shaft, the dynamic damper 10 is firmly fixed on the drive shaft such that the inner circumferential surfaces of the fixing portions 24 are forcedly and closely fitted onto the respective portions of the outer circumferential surface of the drive shaft, based on elasticity of the fixing portions 24. The retainer bands (not shown) made of a hard material such as metal may be fixedly received in the annular groove 26, as needed, so that the fixing portions 24 are further firmly fixed to the respective portions of the drive shaft such that the fixing portions 24 are immovable in the axial and circumferential direction of the drive shaft.

With the dynamic damper 10 installed on the drive shaft as described above, the metallic mass 12 is generally coaxial with and radially outwardly disposed of the drive shaft with a given radial spacing, while being elastically supported by the elastic support members 14, for thereby constitute a secondary vibration system with respect to a primary vibration system as of the drive shaft in order to absolve or reduce the vibration of the drive shaft. In this respect, the dynamic damper 10 is arranged to have a reduced ratio of its spring value as measure in the axial direction to the spring value as measured in the radial or torsional direction, leading to a reduction in the outer diameter of the dynamic damper 10.

In the dynamic damper 10 constructed as described above, the metallic mass 12, the rubber layer 20 and the pair of the elastic support members 14 are formed into an integrally vulcanized product of the elastic body by vulcanizing a rubber material for forming the rubber layer 20 and the elastic support members 14. In the integrally vulcanized product, the elastic support members 14 and the rubber layer 20 constitute an integral elastic body, and are secured to the metallic mass 12 embodied therein.

Figure 5:
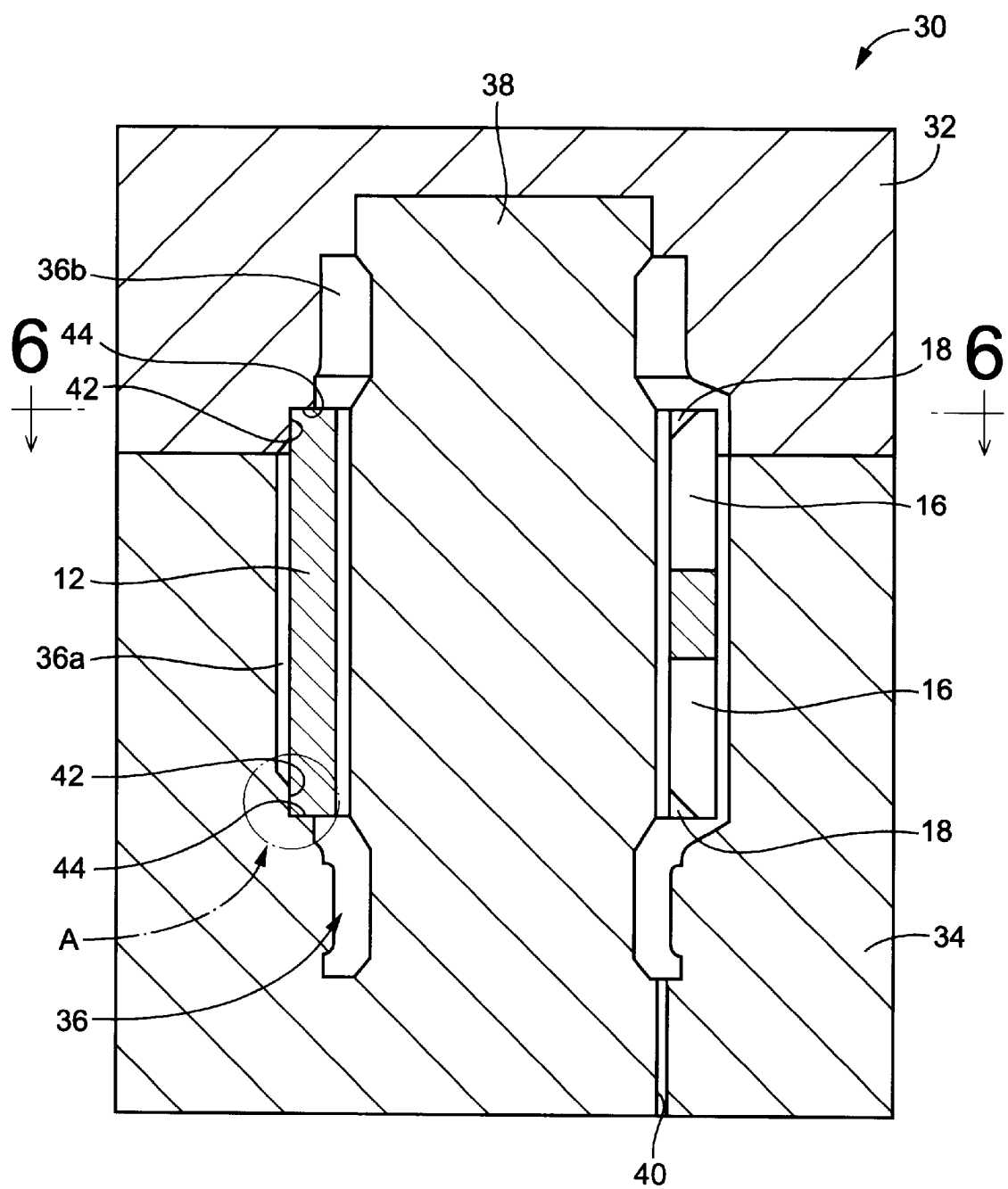
FIG. 5 is an elevational view in longitudinal cross-section of a mold used for molding the dynamic damper of FIG. 1.
Figure 6:
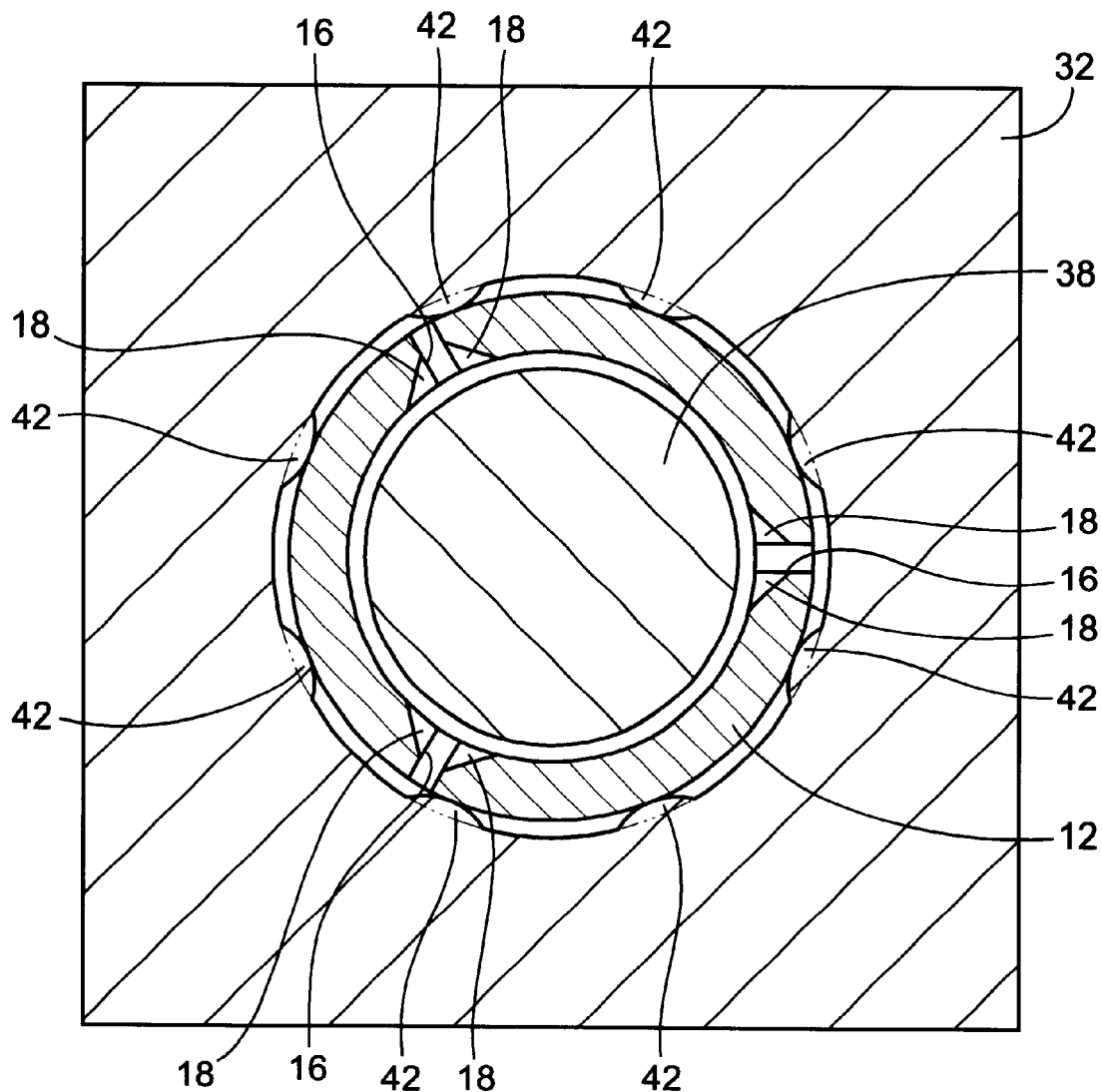
FIG. 6 is a cross sectional view, taken along line 6—6 of FIG. 5.

Referring next to FIGS. 5 and 6, there is shown a mold 30 having a mold cavity 36 the configuration of which corresponds to that of the rubber layer 20 and the elastic support members 14 and the cylindrical fixing portions 24. With the metallic mass 12 set in the mold cavity 36, a suitable rubber material is poured into the mold cavity 36 of the mold 30 and is then vulcanized, thereby effectively providing the rubber layer 20, the pair of the elastic support members 14 and the cylindrical fixing portions 24.

Described in detail, the mold 30 includes an upper mold half 32 and a lower mold half 34 which are butted together at a parting plane extending in the direction perpendicular to the longitudinal direction, to thereby define therebetween the mold cavity 36. The mold cavity 36 includes a first cavity portion 36a whose configuration corresponds to that of the desired rubber layer 20, and a second cavity portion 36b whose configuration corresponds to the outer circumferential surfaces of the elastic support members 14 and the fixing portions 24. The first and second cavity portions cooperate with each other to constitute the single mold cavity 36. The lower mold half 34 has a cavity open in the upper end face at which the lower mold half 34 is butted to the upper mold half 32. The central portion of the bottom surface of the cavity of the lower mold half 34 protrudes in the axially upward direction so as to form a core portion 38. The core portion 38 has the outer circumferential surface which provides a molding surface corresponding to the inner surface of the rubber layer 20 and the pair of elastic support members 14 and the fixing portions 24. The lower mold half 34 is further formed with a through hole 40 served as a gate through which the suitable rubber material is poured or injected into the mold cavity 36.

Figure 7:
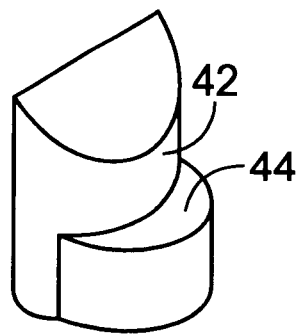
FIG. 7 is an enlarged view of a supporting member formed in section A of FIG. 5.

Upon forming the rubber layer 20, the pair of elastic support members 14 and the cylindrical fixing portions 24 in the mold 30, the metallic mass 12 formed of sintered metal as described above is required to be suitably positioned with respect to the mold cavity 36 such that the metallic mass 12 is located diametrically central portion of the first cavity 36a, while being held in co-axial relationship with the first cavity portion 36a. To this end, the molding surface defining the first cavity portion 36a includes a plurality of supporting protrusions 42 at its axially opposite end portions. In the present embodiment, eight supporting protrusions 42 are formed at each axial end portion of the first cavity portion 36a, such that the eight supporting protrusions 42 are spaced apart from each other in the circumferential direction at substantially constant intervals, and protrude radially inwardly from the corresponding portions of the molding surface with a given radial dimension. As is apparent from FIG. 6, the outer circumferential surface of the metallic mass 12 is held in contact with the radially inwardly protruding end portion of the supporting protrusions 42 at its axially opposite end portions, so that the metallic mass 12 is effectively positioned with respect to the first mold cavity portion 36a in the diametrical direction of the mold 30. Two pairs of adjacent ones of the supporting protrusions 42 that pairs are diametrically opposed to each other are arranged to be formed with semi-circular protrusions 44 as shown in FIG. 7. Each of the semi-circular protrusions 44 is integrally formed in the axially-outward end portion of the corresponding supporting protrusion 42 so as to protrude radially inwardly from the outer circumferential surface of the supporting protrusion 42. In this arrangement, the axially opposite end faces of the metallic mass 12 are held in abutting contact with the semi-circular protrusions 42 which are formed at respective axially opposite end portions of the first mold cavity 36a, so that the metallic mass 12 is effectively positioned with respect to the first mold cavity 36a in the axial direction of the mold 30. Preferably, the metallic mass 12 is positioned with respect to the first mold cavity 36a such that the slits 16 formed through the metallic mass 12 are offset from the supporting protrusions 42 in the circumferential direction of the mold 30. In the above-indicated molding operation, the metallic mass 12 may be previously subjected to suitable washing and degreasing treatments, as needed.

Figure 8:
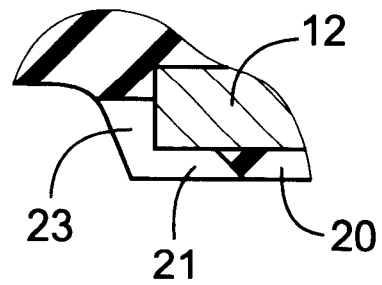
FIG. 8 is an enlarged fragmentally view showing a principle part of the dynamic damper of FIG. 1.

As is apparent from FIGS. 6 and 7, each supporting protrusion 42 has a tapered shape such that the width or the circumferential length of the supporting protrusion 42 is decreased as the supporting protrusion 42 protrudes radially inwardly, so that the supporting protrusion 42 extends in the axial direction of the first mold cavity portion 36a with a generally semi-circular shape as seen in the transverse cross section. This arrangement makes it possible to effectively reduce a required contact surface area of the supporting protrusions 42 for contact with the outer circumferential surface of the metallic mass 12 for supporting and positioning the metallic mass 12 in the first mold cavity portion 36a, so that substantially the entire area of the surface of the metallic mass 12 can be effectively covered with rubber layer 20. Described in detail, the metallic mass 12 is substantially entirely covered with the rubber layer 20 and partially exposed to the atmosphere at respective portions corresponding to the supporting protrusions 42, as shown in FIG. 8. That is, the rubber layer 20 includes eight cutouts 21 formed on each of the axially opposite end portions of the metallic mass 12. The eight cutouts 21 are spaced apart from each other in the circumferential direction of the metallic mass 12 at substantially constant intervals, while having a semi-circular shape in its transverse cross section. The rubber layer 20 further includes four cutouts 23 formed in each of the axially opposite end faces of the metallic mass 12. The four cutouts 23 are spaced apart from each other in the circumferential direction of the metallic mass 12, while protruding radially inwardly from the circumference of the corresponding axial end face of the metallic mass 12 with the semi-circular shape.

According to the present embodiment, each of the supporting protrusions 42 extends in the axial direction with a length which is made sufficiently smaller than that of each of the slits 16. This arrangement permits stable formation of the filling rubber portions 22 with a sufficiently large area, even if the circumferential positions of the supporting protrusions 42 are substantially equal to those of the slits 16 in the circumferential direction of the mold, so that the radially outer and inner parts of the rubber layer 20 disposed outer and inner circumferential surfaces of the metallic mass 12 are firmly connected with each other sufficiently via the filling rubber portions 22.

In the thus obtained dynamic damper 10 as the integral vulcanized product, the rubber layer 20 and the pair of the elastic support members 14 and the cylindrical fixing portions 24 are integrally formed of a single elastic body wherein the metallic mass 12 is embedded as an integral part, upon vulcanization of a rubber material for forming the rubber layer 20, the elastic support members, 14 and the fixing portions 24. In other words, the metallic mass 12 is covered with the rubber layer 20 over its substantially entire area. In addition, the rubber layer 20 is firmly fixed in close contact with the surface of the metallic mass 12 owing to a filling pressure of the rubber material in the mold cavity 36 and shrinkage of the rubber material in the vulcanization process.

In particular, the metallic mass 12 is formed of the sintered metal, so that the surface of the metallic mass 12 is effectively rugged due to the presence of the metallic particles which are bonded with each other in a solid-state by sintering. An inner circumferential surface of the rubber layer 20 is brought into close contact with the rugged surface of the metallic mass 12 upon vulcanization of the rubber material to form the rubber layer 20, and is accordingly made rugged along with the rugged surface of the metallic mass 12. In this arrangement, the rugged surface of the metallic mass 12 and the rugged surface of the rubber layer 20 are mechanically engaged with each other by their raised and recessed portions engaged with each other, as seen in a microscopic level.

In addition, the slits 16 formed through the metallic mass 12 are filled with the rubber layer 20 to thereby provide the filling rubber layers 22 by which the radially inner and outer parts of the rubber layer 20 which are located on the inner and outer circumferential surfaces of the metallic mass 12 are directly connected with each other. This arrangement permits an improved bonding or fixing stability of the rubber layer 20 with respect to the surface of the metallic mass 12 without using an adhesive interposed between the rubber layer 20 and the metallic mass 12.

According to the present embodiment, each of the slits 16 of the metallic mass 12 is open in the corresponding axial end face of the metallic mass 12 and the circumferentially opposite open-end edge portions of the slit 16 have respective radial inner edges which are arranged to have the inclined planes 18. This arrangement is effective to reduce stress concentration in the boundary between the open-end edge portions of the slits 16 and the elastic support member fixed to or located in the vicinity of the open-end edge portions of the slits 16, thereby effectively avoiding or reducing the possibility of deterioration in durability of the elastic support members 14 due to the presence of the slits 16 of the metallic mass 12, resulting in an improved durability of the elastic support members 14.

Thus, the dynamic damper 10 constructed according to the present embodiment permits excellent bonding stability between the metallic mass 12 and the rubber layer 20, while eliminating the 10 use of the adhesive applied between these members 12 and 20. Further, the elimination of the adhesive treatment leads to reduction in cost of manufacture and improved production efficiency of the dynamic damper 10.

Therefore, the dynamic damper 10 constructed according to the present embodiment can exhibit a desired strength and durability enough to endure the significantly large vibrational load applied thereto, thereby exhibiting desired vibration damping effect with high stability. For instance, the rubber layer 20 and the metallic mass 12 are firmly secured to each other, even when an excessively large vibrational load is applied to the dynamic damper 10 in the direction perpendicular to the axial direction, and when a primary load in the axial direction is applied to the dynamic damper 10 so as to install the dynamic damper 10 onto the drive shaft, while when an impact load in the axial direction is applied to the dynamic damper 10 due to the collision of the small pieces of flying rocks with the dynamic damper 10 or the like. Thus, the dynamic damper 10 is capable of preventing undesirable displacement of the rubber layer 20 and the metallic mass 12 relative to each other at the interface therebetween, thereby exhibiting a desirable vibration damping effect with high stability.

In addition, the inclined planes 18 formed at the radial inner edge of the circumferentially opposite open-end edge portions of each slit 16 are arranged not to extend to the outer circumferential surface of the metallic mass 12. This arrangement is advantageous in providing sufficiently large mass of the metallic mass.

While the present invention has been described in detail with its preferred embodiment for the illustrative purpose only, it is to be understood that the invention is not limited to the details of the illustrated embodiment.

For instance, the metallic mass 12 made of a sintered metal is employed in the illustrated embodiment, a metallic mass formed by forging may also be employed. There will be briefly described the metallic mass 12 which is formed of carbon steel or the like by hot forging.

Such a cylindrical metallic mass 12 may be formed by closed die forging such that a disk-shaped blank previously heated is placed within a molding cavity of a cylindrical die and the central portion of the blank is punched out so as to form a bore thereof, or alternatively such that an annular-shaped blank previously heated is placed within the molding cavity of the die and the central portion of the blank is punched so as to expand the bore thereof, for example. According to a general forging process, the thus formed metallic mass 12 is cooled in the process of a direct thermal refining from forging temperature wherein the metallic mass 12 is cooled under a suitable temperature control, or in an as forged process wherein the metallic mass 12 is exposed to the atmosphere with no temperature control. In both cases, the cooled metallic mass 12 is subjected to a treatment for removing a scale formed thereon (hereinafter referred to as a "scale removal treatment") during the cooling method as indicated above, whereby is obtained the desired metallic mass 12 whose scale is removed.

In general, the scale removal treatment as indicated above is performed on the forging in order to remove or clean the scale, i.e., a thin layer of oxides formed or deposited on the surface of the forging. The scale removal treatment may be executed according to a suitable method such as a shot blasting wherein a stream of shots consisting of steel shots or wire-cuts which are accelerated by the air pressure or a circulation force, is applied or collided to the entire surface of the forging member. By executing the shot blasting, the oxides layer of the metallic mass 12 is completely removed from the substantially entire surface of the metallic mass 12, and the resultant entire surface of the metallic mass 12 is effectively roughed or rugged. Preferably, the metallic mass 12 has a surface roughness ranging from 30 μm to 200 μm, more preferably, ranging from 50 μm to 100 μm as measured ten-point means roughness Rz scale.

The slits 16 and the inclined planes 18 to be formed in the metallic mass 12 may be formed at the same time when the metallic mass 12 is formed by forging, or alternatively be formed after the formation of the metallic mass 12 by forging.

It is appreciated that the dynamic damper 10 which employs the metallic mass 12 formed by forging can also enjoy the advantages of the present invention as discussed above with respect to the illustrated embodiment.

If the metallic mass 12 is formed of sintered metal, it is preferable that the slits 16 and the inclined surfaces 18 are formed at the same time when the metallic mass 12 is formed by pressing and sintering the powdered metal. Alternatively, the slits 16 and the inclined surfaces 18 are formed after the metallic mass 12 is formed as the sintered metal.

While the circumferential positions of the respective slits 16 formed at one of axially opposite end portions of the metallic mass 12 are identical with those of the slits 16 formed at the other end portion of the metallic mass 12 in the illustrated embodiment, the circumferential positions of the slits 16 formed on one axial end portion of the metallic mass 12 does not necessarily coincide with those of the slits 16 formed in the other axial end portion of the metallic mass 12. Alternatively, the circumferential positions of the slits 16 formed on one side of the metallic mass 12 are offset from the circumferential positions of the slits 16 formed on the other side of the metallic mass 12 in the circumferential direction of the metallic mass 12.

The number and size (i.e., a width and an axial length) of the slits formed in the metallic mass member may be suitably determined taking into account the required vibration damping characteristics of the dynamic damper, since the mass of the metallic mass member and the fixing stability of the elastic covering layer to the metallic mass member are directly influenced by the number and the size of the slits.

Further, the dynamic damper of the present invention may be suitably positioned relative to the drive shaft by utilizing a small- and a large-diameter portion formed in the drive shaft.

The structure of the mold for molding the dynamic damper is not particularly limited, provided the metallic mass member is positioned and supported by means of a plurality of supporting protrusions. For instance, the mold consisting of a plurality of divided components which are butted together as respective parting plane(s) extending in the longitudinal direction of the mold to thereby define therebetween the mold cavity.

The principle of the present invention is also applicable to a double mass-type dynamic damper wherein two cylindrical metallic mass members are disposed in series in the axial direction with a given axial spacing therebetween, and elastic support members are secured to axially opposite end faces of the respective cylindrical metallic mass members and connected to each other in the axial direction.

It is to be understood that the present invention may be embodied with various other changes, modifications and improvements which may occur to those skilled in the art, without departing from the spirit and scope of the invention defined by the following claims.

What is claimed is:

1. A dynamic damper for mounting on a rod-shaped oscillating member, comprising:

a generally cylindrical metallic mass member formed of sintered metal or forged metal, and adapted to be disposed radially outwardly of the oscillating member;

a pair of elastic support members formed on and extending axially outwardly from axially opposite sides of said metallic mass member for elastically supporting said metallic mass member with respect to the rod-shaped oscillating member; and an elastic covering layer integrally formed with said pair of elastic support members and being fixed in close contact with substantially an entire surface area of said metallic mass member without using an adhesive, covering substantially the entire surface area of said metallic mass member, wherein said metallic mass member has at least two slits extending through a wall thickness thereof, said at least two slits being open in and extending axially inwardly from axially opposite end faces of the metallic mass member, respectively, and being filled with said elastic covering layer, and wherein said metallic mass member further has inclined planes formed at radial inner edges of circumferentially opposite open-end edge portions of each of said at least two slits, each of said inclined planes extending over an inner surface of the corresponding slit, the corresponding axial end face of said metallic mass member and the inner circumferential surface of said metallic mass member, to chamfer said radial inner edge of the corresponding open-end edge portion.

2. A dynamic damper according to claim 1, wherein each of said slits has an axial length of about one-fourth to three fourths of an axial length of the metallic mass member.

3. A dynamic damper according to claim 1, wherein each of said slits has an axial length of one-third to two-thirds of an axial length of the metallic mass member.

4. A dynamic damper according to claim 1, wherein each of said slits has a constant width of 1.0–4.0 mm.

5. A dynamic damper according to claim 1, wherein one of said at least two slits open in one of said axially opposite end faces of said metallic mass member is located in a circumferential position which is identical with a circumferential position of the other slit open in the other end face of said metallic mass member, and said at least two slits have an axial length which is smaller than a half of an axial length of said metallic mass member.

6. A dynamic damper according to claim 1, wherein one of said at least two slits open in one of said axially opposite end faces of said metallic mass member is offset from the other slit open in the other end face of said metallic mass member in said circumferential direction of said metallic mass member.

7. A dynamic damper according to claim 1, wherein each of said inclined planes has a size which is determined such that the corresponding radial inner edge is chamfered by 1.0 mm or more at respective three lines of intersections of adjacent ones of said inner surface of the corresponding slit, the corresponding axial end face of said metallic mass member, and said inner circumferential surface of said metallic mass member.

8. A dynamic damper according to claim 1, wherein each of said inclined planes has a size which is determined such that the corresponding radial inner edge is chamfered by 2.0 mm or more at respective three lines of intersections of adjacent ones of said inner surface of the corresponding slit, the corresponding axial end face of said metallic mass member, and said inner circumferential surface of said metallic mass member.

9. dynamic damper according to claim 1, wherein said surface of said metallic mass member has a ten-point mean roughness Rz within a range from 30 $\mu$m to 200 $\mu$m.

10. A dynamic damper according to claim 1, wherein said surface of said metallic mass member has a ten-point mean roughness Rz within a range from 50 $\mu$m to 100 $\mu$m.

11. A dynamic damper according to claim 1, wherein said pair of elastic support members have a tapered cylindrical shape such that said elastic support members extend axially outwardly and radially inwardly from said axial end faces of the metallic mass member, respectively.

12. A dynamic damper according to claim 1, wherein said elastic covering layer has a thickness within a range of 0.5–5.0 mm.

* * * * *